UNITED STATES PATENT OFFICE 2,462,618

WATER DISPERSIBLE COATING VEHICLE

George E. Eilerman, Milwaukee, Wis., assignor to Pittsburgh Plate Glass Company, Allegheny County, Pa., a corporation of Pennsylvania No Drawing. Original application December 10, 1943, Serial No. 513,727. Divided and this application February 10, 1945, Serial No. 577,353

7 Claims. (Cl. 260—22)

The present invention relates to the preparation of paint vehicles which are emulsifiable in water, and it has particular relation to the preparation of such vehicles from linseed oil or other drying oil.

The objects of the invention comprise the provision of a water emulsifiable paint vehicle which forms relatively hard, water resistant and durable films, which easily forms water emulsions stable and durable over long periods of time, which forms parts having good wetting qualities, and which is relatively inexpensive to prepare.

These and other objects will be apparent from consideration of the following specification and claims.

It has heretofore been proposed to prepare paints embodying a suitable vehicle emulsified in water. When these paints were spread as films, the water quickly evaporated leaving the vehicle in place and in comparatively hard state. Emulsion paints possessed many virtues. They were inexpensive, set very quickly and were free of objectionable odors. However, the films were not usually so hard as might be desired. Their water resistance, especially in washing and in many instances pastes and emulsions were not stable upon standing.

The use of resin emulsion vehicles in present paint manufacturing facilities demands certain properties of the resin emulsion. Such vehicle must withstand any of the heating operations involved in mixing or grinding or paste paints without sacrificing any of their properties of workability. It is important that such vehicles "wet" the surfaces of grinding equipment to insure proper incorporation of pigments and inerts.

A satisfactory resin emulsion vehicle must not undergo any marked changes in inversion of phase on dilution. The wetting properties of a resin emulsion vehicle that may be desirable as a water in oil emulsion must not change on inverting the emulsion to an oil in water type on dilution. Any change in the wetting of the resin emulsion vehicle will prevent the even distribution of the resin and form a discontinuous film on application.

A satisfactory resin emulsion should have stability. An unstable emulsion vehicle will separate on standing into phases, one of which will cake and be difficult to redistribute. This instability is more marked on formulated paste paints.

A satisfactory resin emulsion vehicle must dry well on application but still show no signs of skinning as an emulsion.

A satisfactory resin emulsion vehicle must not show excessive foaming on dilution.

A satisfactory resin emulsion vehicle must have a viscosity high enough to allow for a desirable pigment to binder ratio and still permit easy brushing.

A satisfactory resin emulsion vehicle must dilute with water easily and must be easily removed from a paint brush.

A satisfactory resin emulsion vehicle must dry to a water-insoluble film with a certain degree of surface hardness.

The present invention involves the discovery that a satisfactory resin emulsion vehicle can be prepared from compositions comprising (A) hydrolyzed maleinized linseed oil, hydrolyzed maleinized alkyd resins, or in general from hydrolyzed maleinized natural or synthetic drying oils, with (B) sodium silicate solution and (C) ammonium hydroxide or any water soluble organic amine. "Maleinized oil" is defined as the addendum product of maleic anhydride and any oil, natural or synthetic. "Hydrolysis" of the maleinized oil is the chemical reaction of opening the anhydride linkage of the maleic anhydride residue with the elements of water. The anhydride linkage is the group

Preparation of water emulsion vehicle

A mixture of 2195 parts of linseed oil and about 8 to 15%, e. g., 245 parts of maleic anhydride was heated to 250° C. and held at this temperature for five hours. This maleinized oil was then cooled to 130° C. and 45 parts of water was added. Heating at this temperature was continued for one hour to insure complete hydrolysis of the anhydride addition product. At 25° C. this vehicle had a viscosity of 2–1 (Gardner) and an acid number of 89.2.

300 parts of the above maleinized oil and 9.4 parts of drier solution were intimately mixed. A mixture of 300 parts of water and 30 parts of water-soluble silicate (e. g. sodium or potassium), for example, sodium silicate solution (41° Baumé and 8.9% $NaO_2$) was prepared and added to the oil-drier solution. This entire mass was stirred for about 30 minutes during which time the mixture became thick and appeared grainy. If the stirring is rapid and the time lengthened, this material will become more homogeneous and the precipitate will be more finely divided. This mixture was still acid to litmus and a water-soluble basic nitrogen compound, e. g. 27 parts of ammonium hydroxide (28% NH₃ sp. gr. 0.9) was added to neutralize the mass completely.

Alcoholysis products of maleinized oil and alcohols may also be used with sodium silicate solution to prepare satisfactory resin emulsion vehicles. Alcohols that may be used for such products include the monohydric alcohols, methyl, ethyl, propyl, etc.; the dihydric alcohols, ethylene glycol, diethylene glycol, triethylene glycol, tetraethylene glycol, etc.; the polyhydric alcohols, glycerol, pentaerythritol, mannitol, etc. In preparing these products the alcohol is used to rupture the anhydride linkage of the maleinized oil.

A satisfactory paste paint can be prepared from the above vehicle. One valuable characteristic about the above vehicle is the property of wetting. A dilution of two parts of water to one of the above vehicle can still be painted on sealed surfaces and the film deposited on the surface will be continuous before and after drying. Such a film will dry and no longer be soluble in water.

If the odor of ammonia is objectionable in the above formulation, small amounts of acids such as oleic, stearic, linseed oil acids, rosin, acidic gums, etc., may be added to neutralize any free alkali present. Furthermore, since it is desirable to have a certain brushing viscosity on dilution of any finished paste paint, the viscosity of the original vehicle is reinforced with small amounts of alginates, gums, milk casein, or soy protein.

*Preparation of paste*

A typical paste was prepared from this vehicle substantially as follows:

666 parts of the above vehicle of 48% total solids was mixed with 11 g. of oleic acid, 150 parts of 1% ammonium alginate solution and 123 parts of water to give an emulsion vehicle of 35% total solids.

| | Pounds |
|---|---|
| The above vehicle (35% total solids) | 1.3 |
| Titanium dioxide | 0.5 |
| Talc | 0.8 | was compounded on a three-roll mill. The resulting paste on dilution of two parts of paste to one of water gave a paint, the viscosity of which was between 20 and 30 seconds from a full Ford cup.

In the preparation of the emulsion vehicle, the amounts of sodium silicate solution and concentrated ammonium hydroxide may be used in different proportions to accomplish the same result; that is, emulsions have been prepared in which the acidity of the hydrolyzed maleinized oil has been neutralized by such combinations; 15% sodium silicate solution, 85% concentrated ammonium hydroxide; 25% sodium silicate solution, 75% concentrated ammonium hydroxide; 50% sodium silicate solution, 50% concentrated ammonium hydroxide; 75% sodium silicate solution, 25% concentrated ammonium hydroxide. The larger the amount of sodium silicate solution, the less the gloss of the dried film. This elimination of gloss in the vehicle is of particular advantage in the preparation of flat wall paints.

Many water-soluble amines can be substituted for the concentrated ammonium hydroxide. The following vehicles are illustrative.

(A)

| | Grams |
|---|---|
| Hydrolyzed maleinized linseed oil (described above) | 100 |
| Drier solution | 3.1 |
| Water containing 6.8 g. sodium silicate solution | 200 |
| Water containing 6.5 g. morpholine | 50 |

(B)

| | Grams |
|---|---|
| Hydrolyzed maleinized linseed oil | 100 |
| Drier solution | 3.1 |
| Water containing 6.8 g. sodium silicate solution | 200 |
| Water containing 6.7 g. 2-methyl-2-amino-1-propanol | 50 |

(C)

| | Grams |
|---|---|
| Hydrolyzed maleinized linseed oil | 100 |
| Drier solution | 3.1 |
| Water containing 6.8 g. sodium silicate solution | 200 |
| Water containing 4.6 g. monoethanolamine | 50 |

(D)

| | Grams |
|---|---|
| Hydrolyzed maleinized linseed oil | 100 |
| Drier solution | 3.1 |
| Water containing 6.8 g. sodium silicate solution | 200 |
| Water containing 7.6 g. diethanolamine | 50 |

(E)

| | Grams |
|---|---|
| Hydrolyzed maleinized linseed oil | 100 |
| Drier solution | 3.1 |
| Water containing 6.8 g. sodium silicate solution | 200 |
| Water containing 11.2 g. triethanolamine | 50 |

(F)

| | Grams |
|---|---|
| Hydrolyzed maleinized linseed oil | 100 |
| Drier solution | 3.1 |
| Water containing 6.8 g. sodium silicate solution | 200 |
| Water with 7.9 g. 2-amino-2-methyl-1,3-propanediol | 50 |

(G)

| | Grams |
|---|---|
| Hydrolyzed maleinized linseed oil | 100 |
| Drier solution | 3.1 |
| Water with 6.8 g. sodium silicate solution | 200 |
| Water with 9.1 g. tris (hydroxymethyl)-amino-methane | 50 |

All of these vehicles have the desirable properties described above and can be used to prepare a paste paint that can be diluted with water.

The above observations are not limited to the use of maleinized linseed oil. Any long-oil-length alkyd resin may be used in place of the linseed oil. The following are examples:

1756 parts of linseed oil and 92 parts of glycerine were heated to 200° C. and 2 g. of litharge was added. This mixture was held at this temperature for three hours. 1200 parts of rosin was added and the mixture was heated at 230° C. until the acid number reached 50–55. 300 parts of maleic anhydride was added and the resulting mixture was heated at 200° C. for one hour. The resin mixture was then cooled to 100°–130° C. and 60 parts of water added. Heating was continued at this temperature for an additional hour. This vehicle may be used in any of the above formulations for the preparation of paste paints that will dilute with water.

100 parts of this composition can be substituted for maleinized linseed oil in any of Examples A to G inclusive.

Phthalic acid, maleic acid, fumaric acid, tetrahydrophthalic acid, succinic acid, etc., can be substituted in proper molecular ratio for rosin in the foregoing example or analogous formulations to provide addendum products with maleic anhydride, which can be hydrolyzed and reacted with sodium silicate. Other alcohols such as glycol, pentaerythritol, diethylene glycol, etc., can also be substituted for glycerol in these alkyd resins.

*Example*

1756 parts of linseed oil was trans-esterified with 31 parts of ethylene glycol. 49 parts of maleic anhydride was added and the mixture was heated at 200° C. until the acid number reached 6–9. An additional 185 parts of maleic anhydride was added and the reaction was continued at this temperature for one hour. This reaction mixture was then cooled to 100°–120° C. and 37 parts of water was added. Heating was continued for one hour. This vehicle may be used in any of the above formulations in place of maleinized linseed oil for the preparation of paste paints that will dilute with water.

China-wood oil, extracted linseed oil, high iodine soya bean oil, or any of the synthetic drying oils may be maleinized, hydrolyzed, and used in the above formulations to prepare resin-emulsion paints. Oils, such as linseed or soya bean, concentrated by the process disclosed in Freeman Patent 2,200,391 can also be employed.

In the films obtained by use of the vehicles herein disclosed it would appear that at least some of the unsaturated bonds of the maleic anhydride-drying oil reaction product possess a capacity for air drying and the films thus set up comparatively hard. They, also, become sufficiently water-resistant to admit of washing.

The embodiments of the invention herein disclosed are to be considered merely as being representative or typical. It will be apparent to those skilled in the art that numerous modifications may be made therein without departure from the spirit of the invention or the scope of the appended claims.

This application constitutes a division of my copending application Serial No. 513,727, filed on December 10, 1943, and titled Water dispersible coating vehicle, now Patent No. 2,423,230.

I claim:

1. A water-emulsifiable, air drying coating composition comprising the product obtained by the steps of breaking by hydrolyzation the anhydride linkage of the addendum reaction product of maleic anhydride and a modified alkyd resin resulting from the esterification of a polyhydroxy alcohol with a dicarboxylic acid in the presence of a fatty acid glyceride drying oil and neutralizing the resultant hydrolyzed product with a mixture of alkali metal silicate and a water-soluble basic nitrogen compound of a class consisting of ammonia and a water-soluble amine.

2. A process of forming a water-emulsifiable, air drying coating composition from an alkyd resin comprising the esterification products of polyhydroxy alcohol, a dicarboxylic acid and a fatty acid glyceride drying oil, which process comprises the steps of treating said resin with maleic anhydride to form an addendum reaction product, then hydrolyzing the addendum reaction product to break the anhydride rings therein and neutralize the resultant material with a mixture of alkali metal silicate and a water-soluble basic nitrogen compound of a class consisting of ammonia and a water-soluble amine.

3. A process of forming a water-emulsifiable, air drying coating composition from an alkyd resin comprising the esterification products of a polyhydroxy alcohol, a dicarboxylic acid and a fatty acid glyceride drying oil, which process comprises treating said resin with maleic anhydride to form an addendum reaction product, hydrolyzing the addendum reaction product to break anhydride rings and neutralize the resultant acid material with a mixture of alkali metal silicate and ammonia.

4. As a new composition of matter suitable for use as a water-emulsifiable coating composition an alkyd resin comprising the esterification product of a polyhydroxy alcohol, a dicarboxylic acid and a fatty acid glyceride drying oil, said resin being reacted by addition with maleic anhydride, the anhydride rings thus introduced into the nucleus being split by hydrolysis and the hydrolyzed product neutralized with a mixture of sodium silicate and a water-soluble basic nitrogen compound of a class consisting of ammonia and a water-soluble amine.

5. A water-emulsifiable alkyd resin obtained by hydrolyzing an addendum product of a long oil alkyd resin and maleic anhydride to the extent of breaking the anhydride linkages in said addendum product, then neutralizing said product with a mixture of sodium silicate and ammonia.

6. A water-emulsifiable alkyd resin obtained by hydrolyzing an addendum product of a long oil alkyd resin and maleic anhydride to the extent of breaking the anhydride linkages in said addendum product, then neutralizing said product with a mixture of sodium silicate and a water-soluble amine.

7. A water-emulsifiable alkyd resin comprising the addendum product of maleic anhydride and the esterification product, glycerol, phthalic acid and linseed oil, said addendum product having been hydrolyzed to the extent of breaking the anhydride linkages therein and then neutralized with sodium silicate and a water-soluble basic nitrogen compound of a class consisting of ammonia and a water-soluble amine.

GEORGE E. EILERMAN.

REFERENCES CITED

The following references are of record in the file of this patent:

UNITED STATES PATENTS

| Number | Name | Date |
| --- | --- | --- |
| 2,022,004 | Larson | Nov. 26, 1935 |
| 2,337,920 | Patterson et al. | Dec. 28, 1943 |